(12) United States Patent
Phillips (10) Patent No.: US 10,086,769 B1
(45) Date of Patent: Oct. 2, 2018

(54) BIKE CARRYING FOLDING TRAY ASSEMBLY WITH AUTOMATIC TRAY LOCK

(71) Applicant: Cal M. Phillips, Platteville, WI (US)

(72) Inventor: Cal M. Phillips, Platteville, WI (US)

(*) Notice: Subject to any disclaimer, the term of this patent is extended or adjusted under 35 U.S.C. 154(b) by 0 days.

(21) Appl. No.: 15/984,388

(22) Filed: May 20, 2018

(51) Int. Cl.
*B60R 9/10* (2006.01)
*B62H 3/08* (2006.01)
*B62H 3/12* (2006.01)
*B62H 3/06* (2006.01)

(52) U.S. Cl.
CPC ............ *B60R 9/10* (2013.01); *B62H 3/06* (2013.01); *B62H 3/08* (2013.01); *B62H 3/12* (2013.01)

(58) Field of Classification Search
CPC .... B60R 9/04; B60R 9/06; B60R 9/10; B62H 3/06; B62H 3/08; B62H 3/12
See application file for complete search history.

(56) References Cited

U.S. PATENT DOCUMENTS

| | | |
|---|---|---|
| 3,116,836 A | 1/1964 | McCauley |
| 3,355,028 A | 11/1967 | Mork |
| 3,529,737 A | 9/1970 | Daugherty |
| 3,659,762 A | 5/1972 | Kravitz |
| 3,843,001 A | 10/1974 | Willis |
| 3,861,533 A | 1/1975 | Radek |
| 4,400,129 A | 8/1983 | Eisenberg et al. |
| 4,852,779 A | 8/1989 | Berg |
| 4,875,608 A | 10/1989 | Graber |
| 5,201,244 A | 4/1993 | Stewart et al. |
| 5,653,512 A | 8/1997 | Phillips |
| 5,833,074 A | 11/1998 | Phillips |
| 6,241,322 B1 | 6/2001 | Phillips |
| 6,406,051 B1 | 6/2002 | Phillips |
| 2007/0000962 A1 | 1/2007 | Reeves |
| 2009/0140024 A1 | 6/2009 | McLemore et al. |
| 2015/0083770 A1 | 3/2015 | Ziola |

*Primary Examiner* — Corey Skurdal
(74) *Attorney, Agent, or Firm* — John V. Stewart

(57) ABSTRACT

A bike carrier for a trailer hitch receiver with two trays that pivot between a laterally opposed operational position for holding the wheels of a bike and a forward folded position for compact shipping and storage. In the operational position a tray open lock plate rises under spring force between the inner ends of the trays, stopping the trays from pivoting forward. Other stops on the carrier prevent backward pivoting of the trays. Pushing the plate down allows the trays to pivot forward. A tray folding stop plate may stop the trays from over-rotating forward past a parallel position when folding.

18 Claims, 7 Drawing Sheets

BIKE CARRYING FOLDING TRAY ASSEMBLY WITH AUTOMATIC TRAY LOCK

FIELD OF THE INVENTION

This invention relates to carriers for two-wheeled vehicles, and particularly to bicycle carriers for mounting on a trailer hitch receiver.

BACKGROUND OF THE INVENTION

Racks for carrying bikes on motor vehicles often use hangers, clamps, straps, or cams to hold the bike in the rack. These require multiple operations to secure or release the bike. Hangers and clamps can mar the finish of a bike assembly during vibration of a traveling vehicle. Straps are subject to loosening, tearing, and deterioration.

Bike wheels should not be free to spin in the slipstream of a motor vehicle, and the steering wheel of the bike should not be free to turn. Otherwise, damage to the bike and/or the motor vehicle can result. Many racks do not inherently secure the wheels, relying on the competence and discretion of the user to do so with straps.

U.S. Pat. No. 4,875,608 (Graber) shows a folding bike carrier mounted on the rear of a vehicle. Each wheel is strapped to a tray, and the bike assembly is clamped to the carrier. This design secures the wheels, but the straps and clamps have the disadvantages described above.

U.S. Pat. No. 3,659,762 (Kravitz) shows a bike carrier with deep wells for holding a bike by its wheels. The bike must be strapped to the wells, since it is not clamped by them. Otherwise the bike could fly upward during a bump in the road. There is no adjustment for different sized bikes, so the wells are a loose fit, requiring straps to eliminate play of the bike within the wells.

Some bike carriers require removal of the front wheel, and bolting or clamping of the front dropouts to the carrier. This is inconvenient, even with a quick-release hub on the bike and/or a quick-release dropout clamp on the carrier. The front wheel must be strapped individually to the carrier or stowed elsewhere, possibly bending the rim or spokes, or scratching the carrier or vehicle.

The present inventor has commercial success with a bike carrier described in part in U.S. Pat. No. 5,833,074, issued Nov. 10, 1998. Since that patent issued the inventor has improved the design, added a trailer hitch receiver embodiment, and sold vehicle roof rack and hitch receiver versions. The carrier described herein incorporates aspects from the above patent '074, plus improvements that were available to the public over a year before Jan. 2, 2017, which is the filing date of U.S. Pat. No. 9,956,922 of the present inventor, and is a priority date of several recent patent applications of the present inventor listed in the information disclosure statement, plus further improvements covered by the more recent patent applications, and further improvements not published or covered in other patent applications that are claimed herein. Intervening improvements applicable to both the roof rack and the hitch receiver versions include the following:

a) Wheel retention arms with two parallel side arms and a cross member, which, in combination, form an H-shape or inverted U-shape depending on the position of the cross member, which can be adjusted for different sized bike tires. Adjustment requires a wrench and is limited to a selection of alternate bolt holes on the parallel side arms. It is not infinitely adjustable.

b) The pivotal position of each wheel retention arm is controlled by a linear ratchet with shallow, symmetric ratchet teeth. The pawl can be over-rotated by the user in the release direction, causing drag on the pawl movement while opening the wheel retention arms.

A trailer hitch receiver version of the bike carrier with the following features were on sale for over a year before Jan. 2, 2017:

a) A main tray assembly with two aligned bicycle wheel trays to receive the front and back wheels of a bike. The main tray assembly is pivotally attached to a trailer hitch drawbar, allowing the assembly to pivot upward into a compact position behind a motor vehicle. The user must reach under the main tray assembly to reach the pivot release bar.

b) The two wheel trays pivot into a folded parallel position over the drawbar for compact shipping and storage without disassembly. The wheel trays lock in the operational lateral position by respective levers, but the user must remember this. They do not automatically lock the trays.

c) An add-on tray assembly can be bolted to the main tray assembly to carry a second bike or up to three bikes using two add-on assemblies. The user must reach under all tray assemblies to reach the tray assembly pivot release bar.

SUMMARY OF THE INVENTION

Improvements herein include an automatic locking plate that locks the pivoting bike wheel trays in the operational lateral position with greater strength during an emergency stop of the motor vehicle than prior automatic tray locking mechanisms.

BRIEF DESCRIPTION OF THE DRAWINGS

The invention is explained in the following description in view of the drawings that show.

GLOSSARY

"Bike" herein means a two-wheeled vehicle, including velocipede bicycles and motorcycles.

"Front" and "back" are oriented with a motor vehicle to which the bike carrier is attached.

"H-shaped or inverted U-shaped" herein includes a range of positions of the cross member on the wheel retention arms. If the cross member is at the top of the side members it becomes an inverted U-shape.

"Longitudinal" means parallel to the longest dimension of the subject component.

"Transverse" means perpendicular to the longest dimension of the subject component.

DETAILED DESCRIPTION OF THE INVENTION

Figure 1:
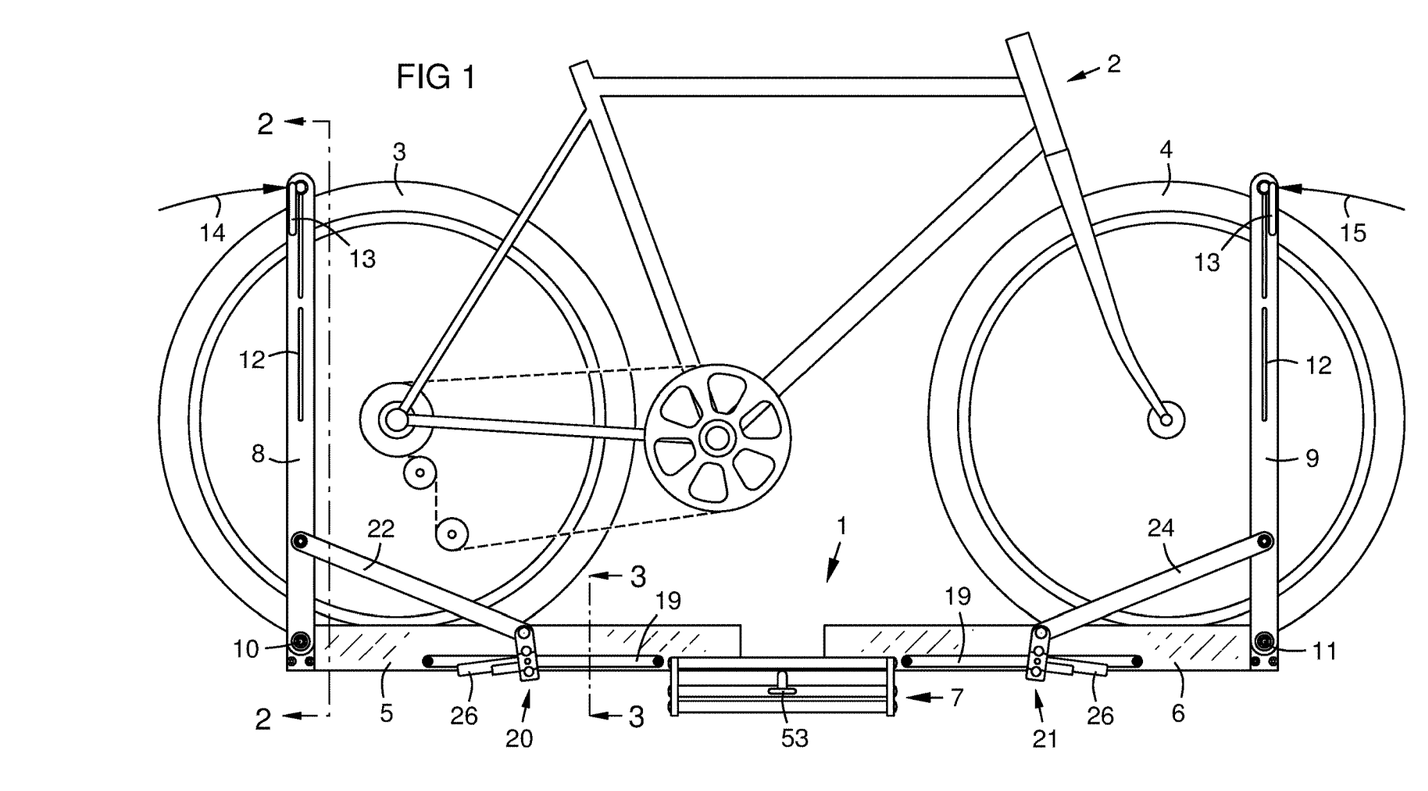
FIG. 1 is a back view of a bike carrier for a trailer hitch receiver according to aspects of the invention.

FIG. 1 is a back view of a bike carrier 1 for a trailer hitch receiver according to aspects of the invention. A bike 2 is mounted on the carrier by placing its wheels 3, 4 in respective wheel trays 5, 6. These trays may be extrusions such as U-channel or V-channel that are convex upward to retain the wheels and lock the steering of the bike. The trays are mounted to a wheel tray assembly 7 that is attached to a drawbar as later shown. A trigger bar 53 pivots the tray assembly up and down as later described.

A wheel retention arm 8, 9 is attached pivotally 10, 11 near the distal end of each tray 5, 6. The retention arms are H-shaped or inverted U-shaped in a side view, depending on the position of a cross member as later shown. Each wheel retention arm may have slots 12 to adjust the position of the cross member for different wheel diameters via a release/tightening mechanism 13. Each retention arm 8, 9 pivots inward 14, 15 until the cross member contacts the tire of the nearest wheel 3, 4. Each arm is locked against a tire by a linear ratchet mechanism 20, 21 that moves along a ratchet bar 19 to retain a stay 22, 24 between the ratchet bar and the retention arm 8, 9. The ratchets 20, 21 maintain tension in the stays 22, 24, clamping the wheels between the cross members of the arms, and securing the bike in all directions by its tires. The ratchet mechanism prevents outward pivoting of the wheel retention arms 8, 9 until the ratchet is released by a pawl lever 26. The retention arms pivot fully inward to the trays when the rack is not in use. Once adjusted and positioned for a given bike size, only one of the retention arms needs to be pivoted for insertion and removal of a bike of that size.

The cross member of each arm 8, 9 contacts the tire of the nearest wheel at a point above and outward from the wheel axle This brackets the bike and blocks it from moving in any direction. The bike is held firmly in place and cannot bounce upward or roll off the tray. The arms contact only the tires via the cross members.

Figure 2:
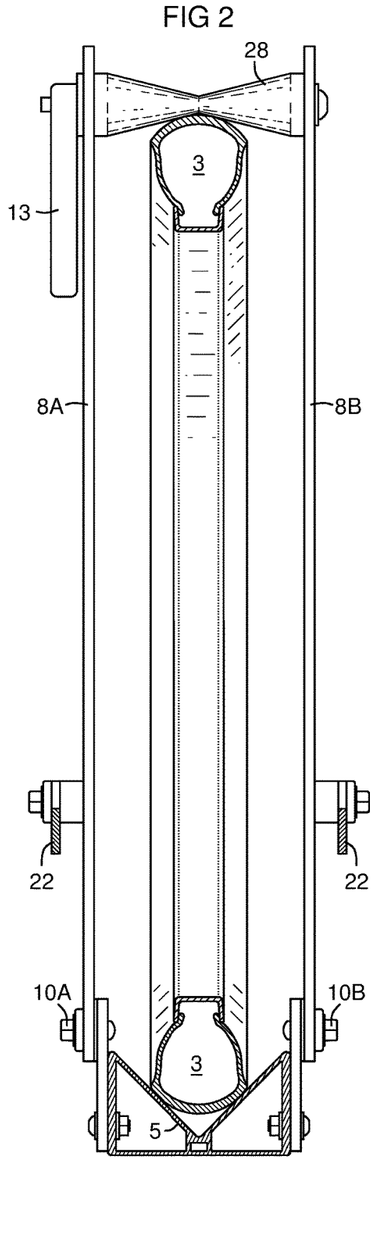
FIG. 2 is a sectional view taken on line 2-2 of FIG. 1.

FIG. 2 is a sectional view taken on line 2-2 of FIG. 1 showing a bike wheel 3 held between a wheel tray 5 and a cross member 28 between first and second side arms 8A, 8B of the retention arm 8 of FIG. 1. The cross member may be loosened with a lever 13 for adjustment. The lever may be for example a quick-release cam lever or a simple threaded lever acting as a nut and wrench. The retention side arms 8A, 8B may be attached to a distal end of the wheel tray with respective coaxial pivotal connections 10A, 10B.

Figure 3:
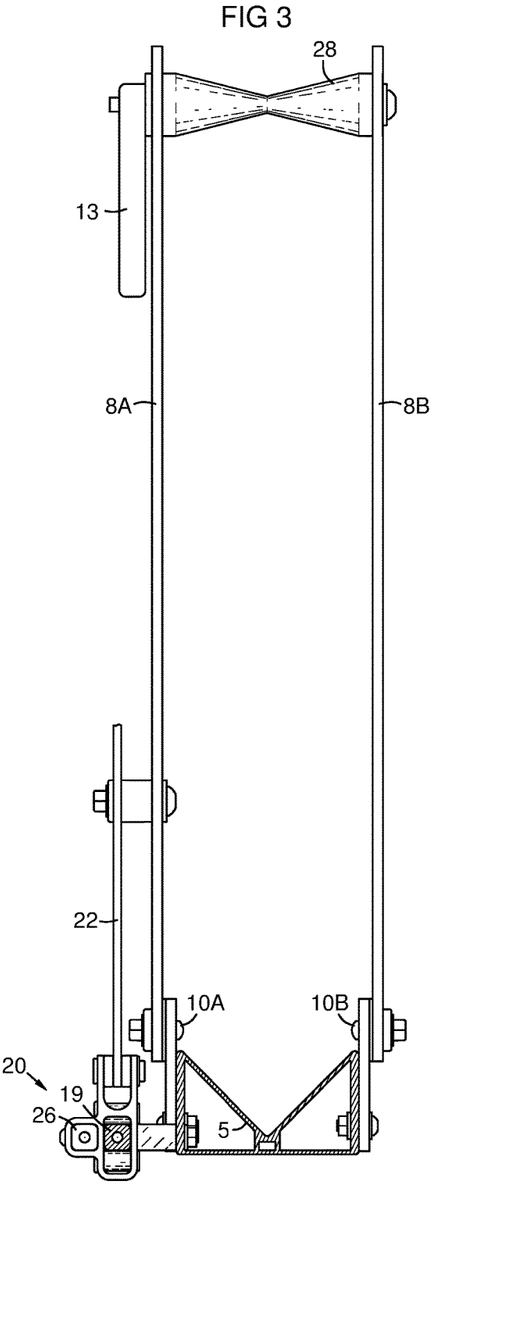
FIG. 3 is a sectional view taken on line 3-3 of FIG. 1.

FIG. 3 is a sectional view taken on line 3-3 of FIG. 1 showing the linear ratchet bar 19 and ratchet mechanism 20 that releasably locks the stay 22 relative to the ratchet bar, holding the cross member 28 tightly against the tire of the bike.

Figure 4:
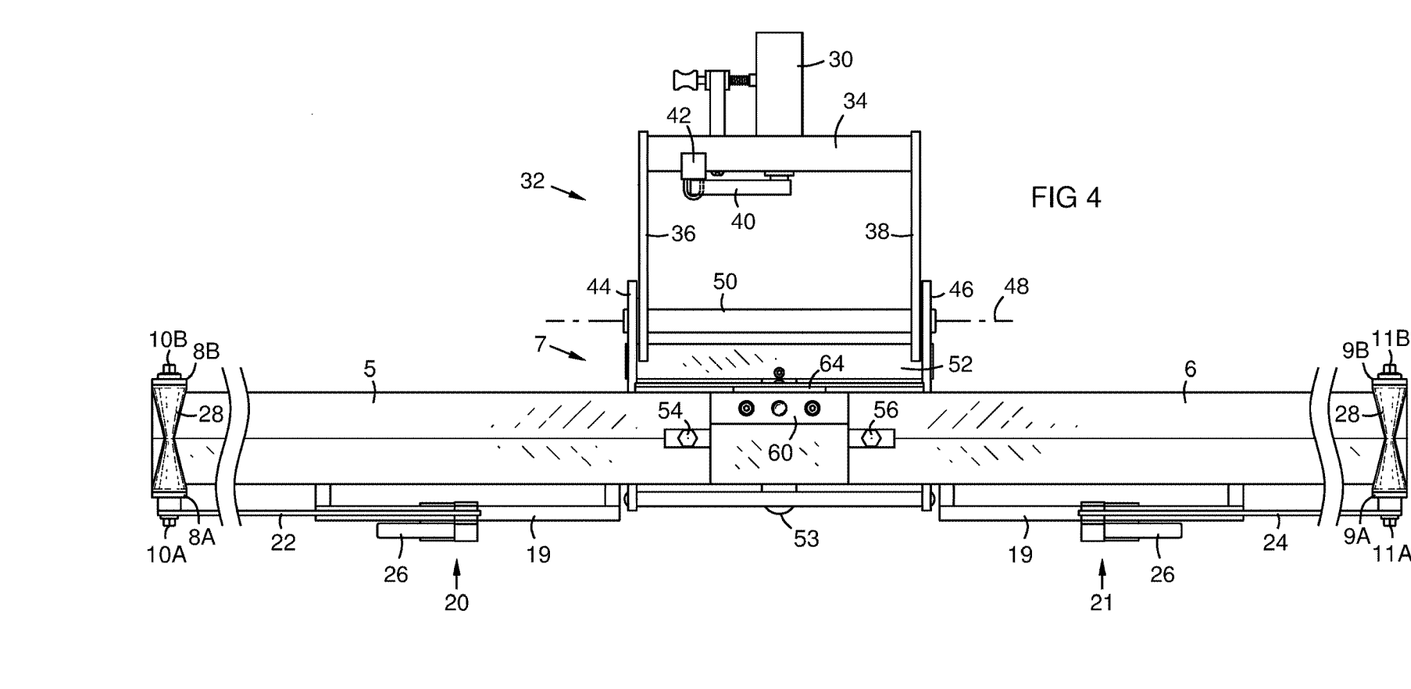
FIG. 4 is a top view of the bike carrier of FIG. 1.

FIG. 4 is a top view of the bike carrier of FIG. 1. A trailer hitch drawbar 30 may be attached to the wheel tray assembly 7 via a drawbar assembly 32 comprising a horizontal crossbar 34 attached to the drawbar, and left and right vertically oriented pivot plates 36, 38 attached to the crossbar. The drawbar may have an internal mechanism operated by a lever 40 that tightens the drawbar in the receiver tube of the vehicle. A padlock 42 may secure the lever when the drawbar is tightened in the receiver.

The wheel tray assembly 7 comprises left and right side plates 44, 46 attached to the drawbar assembly on a horizontal pivot axis 48 that allows the wheel tray assembly 7 to pivot up close behind the motor vehicle when no bike is being carried, and to pivot down for opening a tailgate. The pivot axis may be implemented by a pivot axle journaled in a pivot cross member 50 between the pivot plates 36, 38 that serves as a structural member of the drawbar assembly 32. The vertical pivot position of the bike tray assembly 7 is locked with a pivot lock bar 52 operated via a trigger bar 53 from the back of the tray assembly 7.

The bike wheel trays 5, 6 are mounted to the main tray assembly 7 by respective pivot attachments 54, 56 to pivot between the shown operational co-aligned laterally extending position and a side-by-side folded forward position over the drawbar assembly 32 for shipping and storage as later shown. A tray open lock plate 60 is disposed between the inner ends of the trays to prevent the trays from pivoting forward until they are released by depressing the tray open lock plate. A tray folding stop plate 64 stops the trays from pivoting forward past a desired compact position, such as parallel.

Wheel retention arm 8 (FIG. 1) comprises two side arms 8A, 8B attached to opposite sides of the wheel tray 5 by respective coaxial pivot points 10A, 10B. A cross member 28 is attached between the two side arms through the slots 12 (FIG. 1). The cross member 28 may have a waist as shown to receive a bike tire. Wheel retention arm 9 comprises two side arms 9A, 9B attached to opposite sides of the wheel tray 6 by coaxial pivot points 11A, 11B. A cross member 28 is attached between the two side arms through the slots 12 (FIG. 1). The cross member 28 may have a waist as shown to receive a bike tire.

Figure 5:
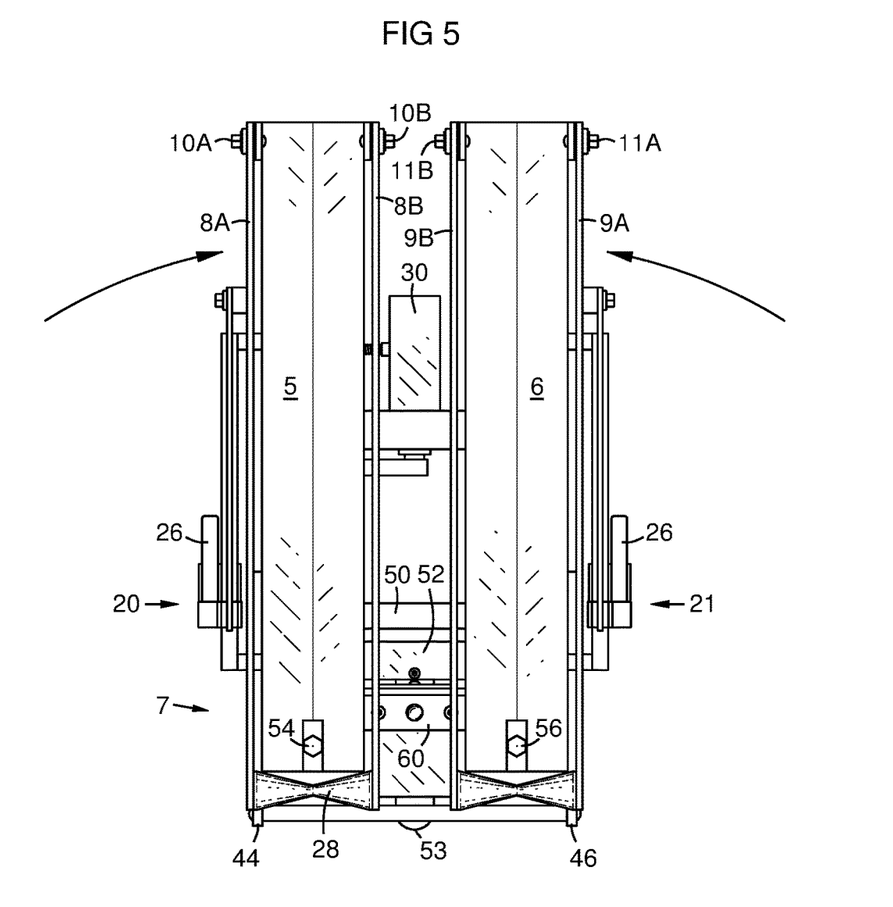
FIG. 5 is a view as in FIG. 4 with the wheel trays folded.

FIG. 5 is a top view of the carrier with the trays 5, 6 folded forward about their pivot attachments 54, 56 for shipping and storage. No assembly is required by the user on receipt of the carrier. They just unfold the trays, which automatically lock in the open position via tray open lock plate 60 as later shown.

Figure 6:
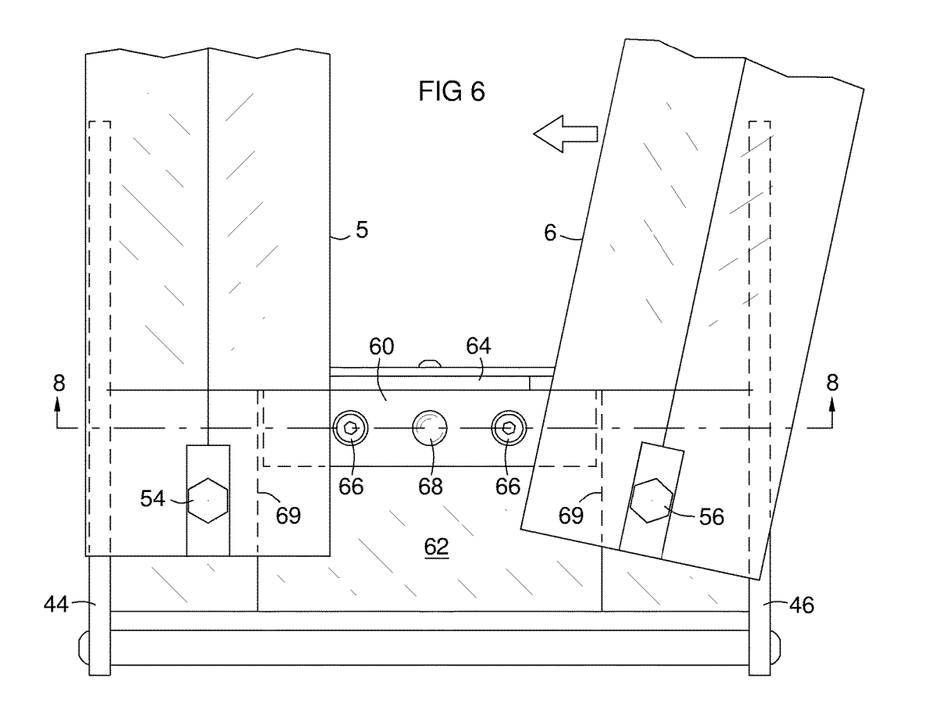
FIG. 6 a partial top view of the wheel trays being folded.

FIG. 6 is a partial top view of the wheel trays 5, 6 being pivoted to a folded forward position. The trays may be mounted by pivot attachments 54, 56 to a tray crossbar 62 that spans between the side plates 44, 46. A stop plate 64 may be attached to the front of the crossbar to stop the forward pivoting of the trays before they contact each other. It may stop them in a parallel position. Tray 5 is shown stopped against the left side of the stop plate 64, while tray 6 is in the process of pivoting. The tray open lock plate 60 may be vertically slidably mounted on bolts 66 with springs urging the plate upward as later shown. Here the tray open lock plate 60 has been depressed below the trays as shown by dashed ends of the plate 60. A central depression 68 may be provided in the upper surface of the lock plate 60 to guide a user's thumb position for depressing the plate to release the trays. Spacers 69 of a low friction material such as Delrin® are disposed between the wheel trays 5, 6, and the tray crossbar 62 to provide space under the trays for the tray open lock plate 60 when it is depressed.

Figure 7:
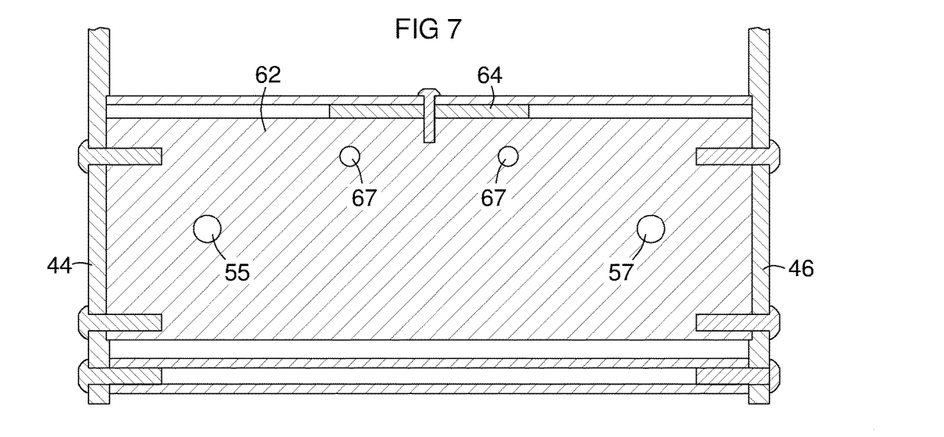
FIG. 7 is a sectional top view of the tray crossbar.

FIG. 7 is a top sectional view of the tray crossbar 62 showing bolt holes 67 for the tray open stop plate and bolt holes 55, 57 for the tray pivot attachment bolts 54, 56.

Figure 8:
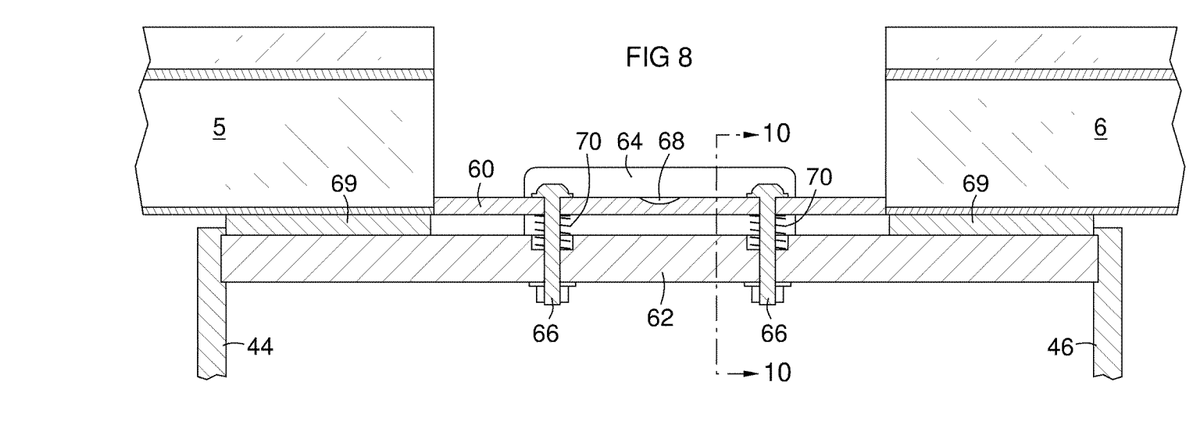
FIG. 8 is a sectional view taken on line 8-8 of FIG. 6 with the trays open.

FIG. 8 is a sectional view taken on line 8-8 of FIG. 6, showing the tray open lock plate 60 in the up position that locks the trays 5, 6 in the operational position. Springs 70 urge the tray open lock plate to the up position to automatically lock the trays when they are deployed. An audible click is produced when the tray open lock plate springs up into the locked position. Chambers for the springs 70 may be provided in the tray crossbar as shown or in the tray open lock plate 60 or both. The chambers may be shallow since few turns of the spring wire are needed. The springs may be conical allowing the chambers to be very shallow.

Figure 9:
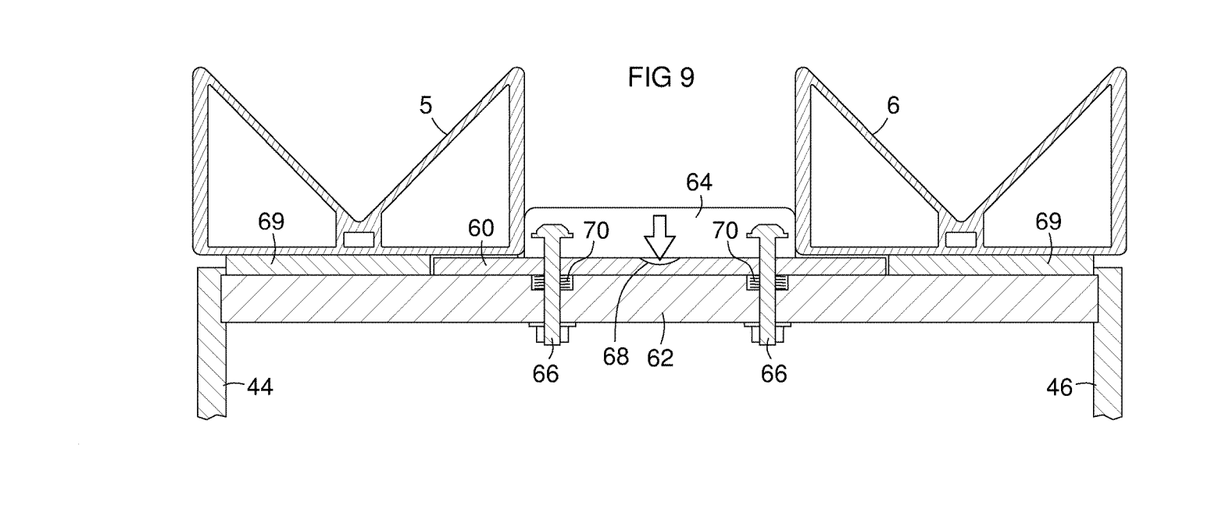
FIG. 9 is view as in FIG. 8 with the trays folded.

FIG. 9 is a sectional view as in FIG. 8 showing the tray open lock plate 60 depressed below the trays 5, 6, allowing them to fold into the forward position as shown in FIG. 6.

At this position, the tray folding stop plate 64 contacts the trays 5, 6 to stop them in the forward position.

Figure 10:
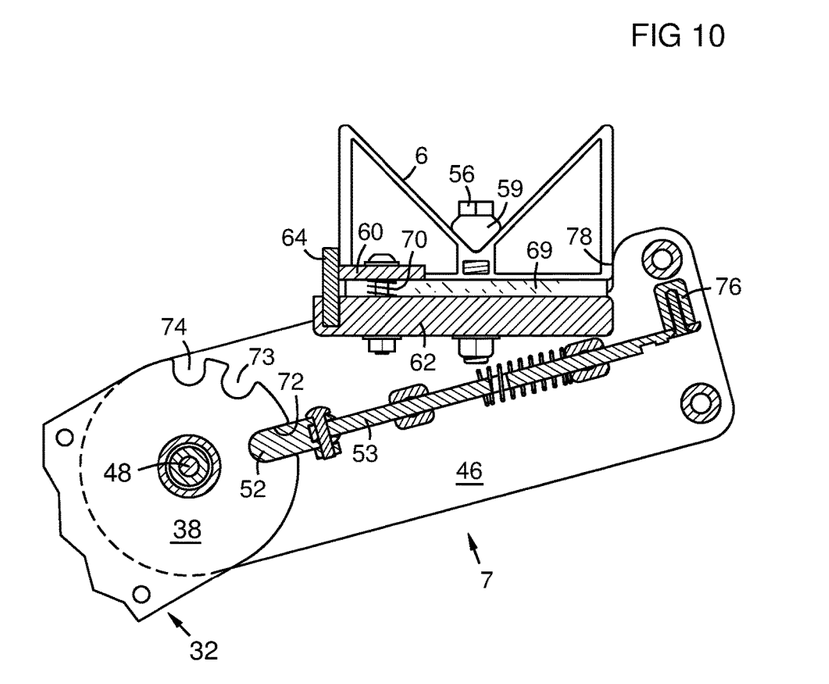
FIG. 10 is a sectional view taken on line 10-10 of FIG. 8

FIG. 10 is a sectional view taken on line 10-10 of FIG. 8, showing the right side plate 46 of the tray assembly 7 pivotally attached to the right pivot plate 38 of the drawbar assembly 32 on a pivot axis 48. The pivot lock bar 52 slides into a selected slot 72, 73, 74 in the pivot plate to set a vertical pivot position of the wheel tray assembly 7. A trigger bar 53 releases the pivot lock bar 52 from a slot via a manual grip or trigger 76 at the back of the tray assembly. The wheel tray 6 is mounted to the tray crossbar 62 by a bolt 56 through a tray holding bar 59 that distributes pressure from the bolt head to the bottom of the tray 6. A low friction spacer 69, for example made of Delrin®, supports the tray on the crossbar 62 and facilitates pivoting of the tray. It provides clearance between the tray 6 and the crossbar 62 so the tray clears the tray open lock plate 60 when the open lock plate is pressed down against the spring 70.

The tray open lock plate 60 may be sized to cover not more than the front half of the end of the tray as shown. This prevents the tray from pivoting forward. Backward pivoting of the tray may be prevented by a stop 78 on each side plate 44, 46. Alternately, the open lock plate 60 can extend to the back of the trays, to prevent them from pivoting both forward and backward. However, a smaller lock plate as shown is easier to press evenly downward between two close springs without cocking up on one side.

Embodiments of the present invention shown and described herein are provided by way of example only. Changes and substitutions may be made without departing from the invention herein. Accordingly, the invention should be limited only by the intended meaning and scope of the claims.

The invention claimed is:

1. A bike carrier comprising:
   first and second trays for holding respective first and second wheels of a bike;
   each tray pivotally mounted to a tray assembly to pivot between an opposed laterally extending operational position and a folded side-by-side position for shipping and storage; and
   a tray open lock plate mounted on the tray assembly between inner ends of the two trays that releasably contacts the inner ends of the trays in the operational position;
   wherein said contact prevents the trays from pivoting toward the folded position.

2. The bike carrier of claim 1 wherein the tray open lock plate comprises a horizontally oriented plate mounted on the tray assembly and urged upward by a spring or springs to fill at least a forward portion of a gap between the two wheel trays in the operational position thereof, automatically locking the trays in the operational position.

3. The bike carrier of claim 2 further comprising a stop surface on the tray assembly that prevents the wheel trays from pivoting backward past the operation position.

4. The bike carrier of claim 1 wherein the tray assembly comprises a tray crossbar spanning between two side plates, the two trays are pivotally attached to the tray crossbar, the tray open lock plate is mounted on the tray crossbar for vertical movement between a tray locking position and a tray releasing position, and the tray open lock plate is urged by a spring or springs into the tray locking position and automatically locks the trays in the operational position thereof.

5. The bike carrier of claim 4, further comprising a tray folding stop plate on the tray assembly that stops the trays from pivoting into contact with each other when pivoting the trays from the operational position to the folded side-by-side position.

6. The bike carrier of claim 5, wherein the tray folding stop plate comprises a vertically oriented plate mounted on a front portion of the tray crossbar.

7. A bike carrier for a trailer hitch receiver, comprising:
   two wheel trays that pivot between a laterally opposed operational position for holding wheels of a bike and a forward position for shipping and storage of the carrier; and
   a tray open lock plate on the carrier that rises under spring force between inner ends of the trays in the operational position thereof and prevents the trays from pivoting forward;
   wherein pushing the tray open lock plate downward against the spring force releases the trays to pivot forward for shipping and storage.

8. The bike carrier of claim 7, wherein the tray open lock plate in an up position at least partly fills a gap between the inner ends of the trays in the operational position thereof.

9. The bike carrier of claim 7, further comprising first and second stops on the carrier that block the trays from pivoting backward past the laterally opposed position when unfolding the trays from the forward position.

10. The bike carrier of claim 7, wherein the tray open lock plate in an up position thereof fills only a forward portion and not more than half of a gap between the inner ends of the trays in the operational position thereof.

11. The bike carrier of claim 10, further comprising first and second stops on respective first and second side plates of the bike carrier that stop the trays from pivoting backward past the laterally aligned position when unfolding the trays from the forward position.

12. The bike carrier of claim 7, further comprising:
   a tray crossbar mounted between first and second side plates of the carrier;
   each of the two trays pivotally mounted to the tray crossbar;
   the tray open lock plate retained on the crossbar by first and second vertical bolts through the crossbar that provide vertical play for the tray open lock plate along an upper shaft portion of each bolt between an upward tray blocking position and a downward tray releasing position of the tray open lock plate; and
   first and second springs around the respective bolts between the tray open lock plate and the crossbar that urge the tray open lock plate into the upward position.

13. The bike carrier of claim 12, further comprising a depression in an upper surface of the tray open lock plate, the depression centered between the two bolts to indicate a user pressure point to push the plate downward to release the trays.

14. The bike carrier of claim 7, further comprising a tray folding stop plate on the bike carrier that stops the trays from pivoting into contact with each other when pivoting the trays to the forward position.

15. The bike carrier of claim 14, wherein the tray folding stop plate is a vertical plate mounted on a front portion of a crossbar of the bike carrier to which the two trays are pivotally attached.

16. The bike carrier of claim 7, further comprising a tray folding stop plate on the bike carrier that blocks the trays from pivoting past a parallel position when pivoting the trays forward.

17. A bike carrier comprising:
a bike carrying tray assembly attached to a drawbar for a trailer hitch receiver;
first and second wheel trays on the tray assembly for holding respective first and second wheels of a bike;
each tray mounted to the tray assembly on a vertical pivot axis to pivot between a laterally extending operational position that is opposed to, and co-aligned with, the other tray and a folded forward position toward the drawbar for shipping and storage; and
a tray open lock plate mounted on the tray assembly between inner ends of the two trays that releasably contacts the inner ends of the trays in the operational position;
wherein said contact prevents the trays from pivoting forward.

18. The bike carrier of claim 17, wherein the tray open lock plate is urged upward between the inner ends of the wheel trays by a spring or springs, and can be pushed downward against the spring or springs to clear a bottom surface of each wheel tray to allow forward pivoting of the wheel trays.

* * * * *